April 11, 1939.  J. E. CORNWALL  2,154,034
BRAKE MECHANISM
Filed Sept. 3, 1937  2 Sheets-Sheet 1
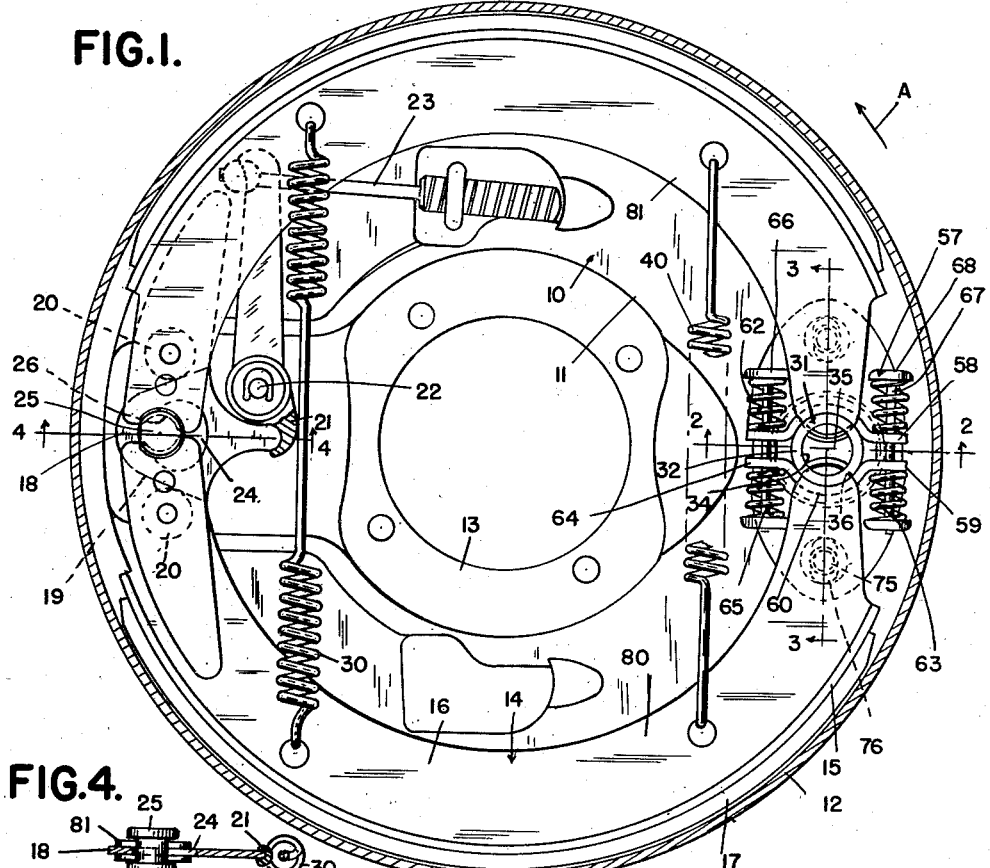
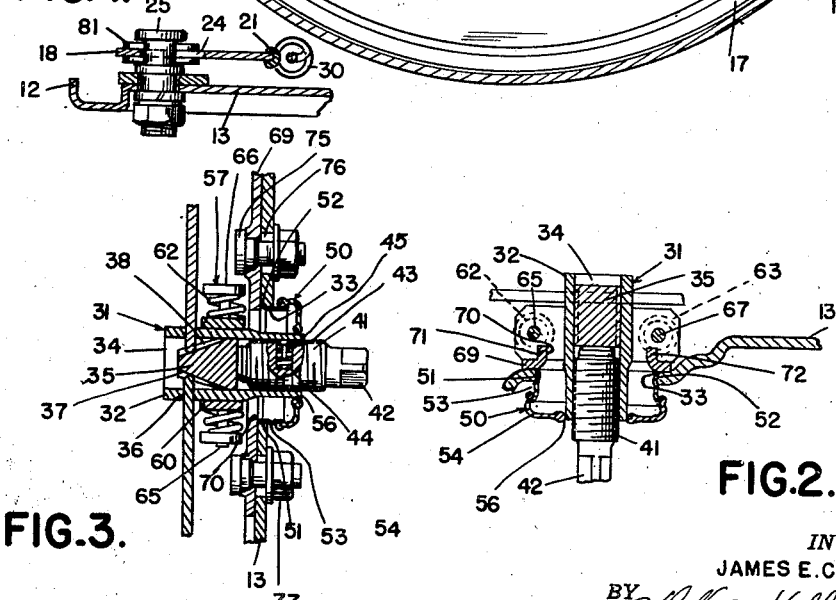
INVENTOR
JAMES E. CORNWALL
BY
ATTORNEYS April 11, 1939.	J. E. CORNWALL	2,154,034
BRAKE MECHANISM
Filed Sept. 3, 1937	2 Sheets-Sheet 2
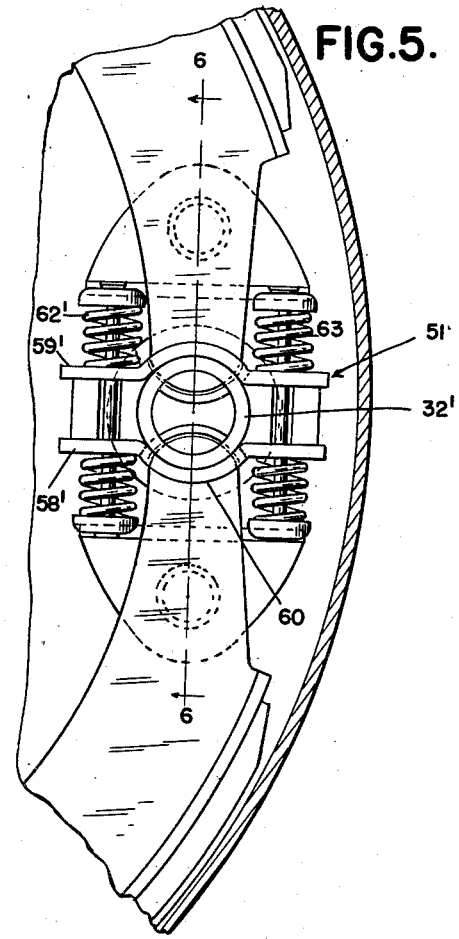
FIG.5.
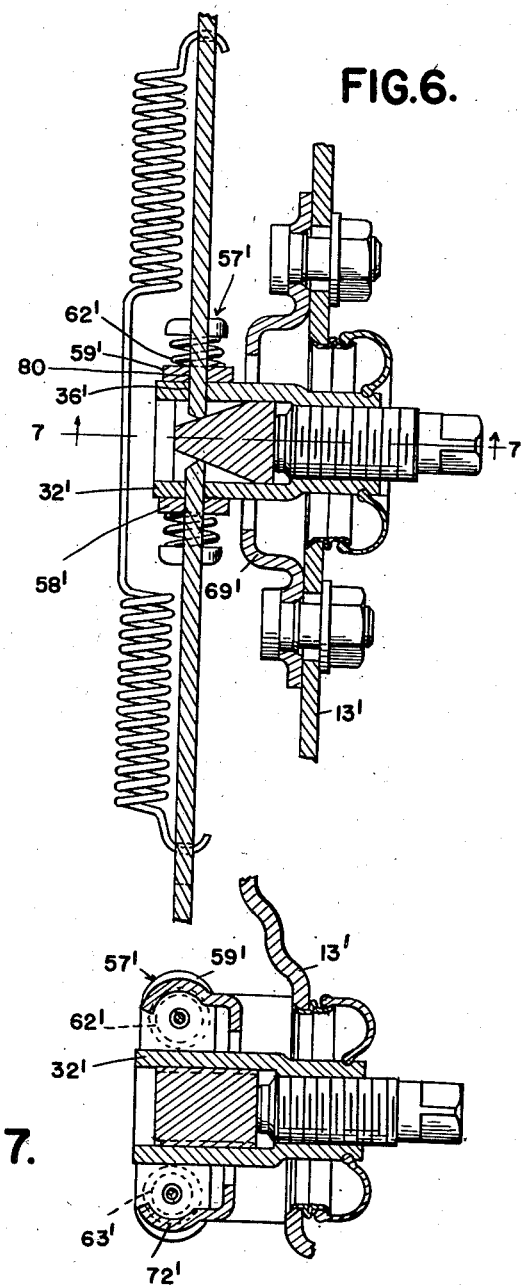
FIG.6.
FIG.7.
INVENTOR
JAMES E. CORNWALL
BY
ATTORNEYS Patented Apr. 11, 1939

2,154,034

UNITED STATES PATENT OFFICE 2,154,034

BRAKE MECHANISM

James E. Cornwall, Detroit, Mich., assignor to Kelsey-Hayes Wheel Company, Detroit, Mich., a corporation of Delaware Application September 3, 1937, Serial No. 162,368

17 Claims. (Cl. 188—79.5)

This invention relates generally to brake mechanisms and refers more particularly to brake constructions of the type employed in connection with the wheels of vehicles.

It is one of the principal objects of the present invention to improve the construction and operation of vehicle wheel brakes by providing a novel relatively simple centering device for the brake friction means which is so constructed as to effectively center the brake friction means in the brake drum over a long period of use.

Another advantageous feature of this invention consists in the provision of brake mechanism having an adjustment anchor device supported in such a manner as to afford servo in either direction of rotation of the brake drum and adapted to be centered in the brake drum by my improved centering device.

A further object of this invention resides in the provision of brake mechanism of the character set forth wherein the adjustment device is supported by the centering means for shifting movement with the brake friction means in either direction of rotation of the drum and wherein the adjustment device cooperates with the centering means to effectively center the brake friction means in the drum in the released posititon of the brake mechanism.

In addition to the foregoing, the present invention contemplates a centering device capable of adjustment to provide for accurately initially centering the brake friction means in the brake drum. The manner in which this is accomplished and the foregoing, as well as other objects, will be made more apparent as this description proceeds, especially when considered in connection with the accompanying drawings, wherein:

Figure 1 is an elevational view, partly in section, of brake mechanism constructed in accordance with this invention;

Figures 2, 3, and 4 are sectional views taken substantially on the planes indicated by the lines 2—2, 3—3, and 4—4 of Figure 1;

Figure 5 is a fragmentary elevational view, partly in section, of a slightly modified form of brake shoe centering device;

Figure 6 is a sectional view taken substantially on the plane indicated by the line 6—6 of Figure 5; and Figure 7 is a sectional view taken substantially on the plane indicated by the line 7—7 of Figure 6.

The brake mechanism selected herein for the purpose of illustrating the present invention is shown in the several figures as provided with a brake drum 10 having a web portion 11 provided with an annular axially extending flange 12 at the periphery thereof and having a backing plate 13 supported in the usual manner opposite the web to close the interior of the drum. In accordance with conventional practice, the backing plate is adapted to be fixed against rotation with the drum and serves to support the brake friction means 14 within the drum.

In the present instance, the brake friction means 14 comprises a pair of shoes substantially T-shaped in cross section and having the opposite ends spaced from each other circumferentially of the drum. The shoes are supported on the backing plate with the axially extending portions 15 located adjacent the inner surface of the brake flange 11 and with the radial portions 16 extending inwardly toward the axis of rotation of the drum. A suitable brake lining 17 having the desired coefficient of friction is secured to the outer surfaces of the axially extending portions 15 of the brake shoes so as to engage the inner surface of the brake flange 11 when the shoes are moved outwardly toward the brake flange.

Although various different types of actuators may be employed for the purpose of moving the brake shoes outwardly into engagement with the brake flange 12, nevertheless, for the purpose of illustration, I have shown a wedge type actuator for accomplishing this result. In detail, the actuator is provided with a wedge 18 supported on the backing plate between the ends of the brake shoes at one side of the drum for movement radially outwardly relative to the backing plate and friction means. The opposite edges 19 of the wedge diverge radially inwardly and engage suitable rollers 20 carried by the adjacent ends of the shoes. In the present instance, the wedge is moved radially outwardly to effect a corresponding movement of the adjacent end of the shoes into engagement with the brake flange by means of a lever 21 pivotally mounted adjacent one end thereof on the backing plate 13 by a stud 22. Upon reference to Figure 1, it will be noted that the short arm of the lever engages the radially inner end of the wedge 18, and the extremity of the long arm of the lever is connected to a cable 23. The cable 23 extends out of the drum through the backing plate and is adapted to be connected to a suitable control (not shown).

Referring again to Figure 1 of the drawings, it will be noted that the wedge 18 is provided with an opening 24 therethrough for receiving a stud 25 secured to the backing plate 13. It will be observed that the dimension of the opening 24 in a direction circumferentially of the brake drum is sufficiently greater than the diameter of the portion of the stud 25 extending through the opening to provide the clearance required for the wedge to shift circumferentially of the brake drum with the brake shoes when the latter are expanded into engagement with the brake flange.

The stud 25 also forms an abutment for the adjacent ends of the brake shoes in the released position of the latter and, for accomplishing this result, the ends of the shoes adjacent the stud are recessed, as at 26, to engage opposite sides of the stud. Attention is called to the fact that in Figure 4 of the drawings, the stud is shown as secured to the backing plate in a radial slot for movement radially of the drum when the shoes are centered by my improved centering means to be presently described. The actuator ends of the shoes are normally urged into engagement with the stud by means of the retraction spring 30 having the opposite ends connected to the shoes adjacent the actuator ends thereof.

For the purpose of varying the clearance between the brake linings 17 in the shoes and the brake flange 12, I provide an adjustment anchor device 31. Upon reference to Figure 3, it will be noted that the adjustment anchor device is provided with a bracket 32 extending axially through an enlarged opening 33 in the backing plate 13 and having a longitudinally extending bore 34 within which a wedge 35 is supported for sliding movement axially of the brake drum. The bracket 32 is located at the ends of the shoes opposite the actuator ends and the side walls of the bracket are slotted, as at 36, to permit the adjustment ends of the shoes to extend into the bore 34 of the bracket and engage the opposite sides 37 of the wedge 35. The opposite sides 37 of the wedge are tapered from the rear end of the wedge toward the axis of the latter and are provided with recesses 38 to receive the adjustment ends of the shoes. With this arrangement, it will be noted that movement of the wedge in a forward direction relative to the bracket causes the shoes to swing outwardly about the stud 25 to reduce the clearance between the friction linings 17 in the shoes and the brake flange 12. The adjustment ends of the shoes are maintained into engagement with the wedge 35 by means of the retraction spring 40 having the opposite ends connected to the shoes adjacent the adjustment ends of the latter.

The wedge is adjusted relative to the bracket by means of the screw 41 threaded in the rear end of the bracket and adapted to abut the wedge. The head 42 of the screw is shaped for engagement with a suitable wrench and extends a sufficient distance rearwardly from the backing plate to permit the same to be conveniently manipulated.

In the present instance, accidental movement of the screw 41 is prevented by a spring pressed detent 43 supported in a recess in the screw for sliding movement perpendicular to the axis of the screw and normally urged to its outermost position by means of a spring 44 arranged in the recess. The radially outer end is adapted to successively engage in recesses 45 extending axially of the bore 34 in circumferential spaced relationship. With this construction, accidental rotation of the screw is yieldably resisted and predetermined increments of adjustment of the screw are indicated by the clicks produced by successive engagement of the outer end of the detent in the recesses 45. When initially assembling the screw and bracket, the detent is merely held into its recess until the radially outer end of the detent is engaged by the portion of the bracket at the rear end of the bore 34, whereupon the detent may be released and threading of the screw into the bracket continued until the wedge is moved by the screw to its extreme adjusted position wherein the shoes are engaged with the brake flange. The screw is then backed off the amount required to secure the desired clearance between the brake shoes and brake flange.

It has previously been stated that the bracket 32 extends through an enlarged opening 33 in the backing plate 13 and the dimension of this opening is sufficiently greater than the diameter of the portion of the bracket extending therethrough to permit the extent of shifting movement of the bracket circumferentially of the drum required to secure the desired servo action. The clearance provided between the bracket and sides of the opening 33 is sealed by means of a closure 50. The closure 50 comprises a sheet metal ring 51 having the forward end extending into the opening 33 and flared outwardly to engage the tapered seat 52 provided at the front side of the opening 33. Also, the sleeve 51 is fashioned to provide an annular bead 53 adapted to engage the rear side of the backing plate and cooperate with the flared portion of the sleeve to secure the same to the backing plate. The rear end of the sleeve is also flared outwardly and a flexible cap 54 is secured over the rear end of the sleeve. The cap is preferably formed of rubber and is provided with a central opening 56 therethrough for receiving the bracket. It will, of course, be understood that the cap is sufficiently flexible to permit shifting movement of the bracket with the brake shoes when the latter are expanded by the actuator against the brake flange.

The adjustment bracket 32 is supported centrally of the opening 33 by a centering device 57. The centering device 57 is provided with opposed saddle members or straps 58 and 59 having intermediate transversely curved portions 60 cooperating with each other to form a bearing for the bracket 32. Upon reference to Figure 1, it will be noted that the intermediate portions 60 have a radius corresponding to the radius of curvature of the bracket and engage opposite sides of the bracket. The portions 60 of the saddle members are maintained into frictional engagement with the opposite sides of the bracket by means of the sets of opposed springs 62 and 63. The opposed springs of the set 62 are supported at the radially inner side of the adjustment anchor device and the springs 63 are supported at the radially outer side of the device. Each spring of the set 62 is arranged at opposite sides of the radially inwardly extending ends 64 of the saddle members and both springs surround a rod 65 which extends through the portions 64 of the saddle members. The adjacent ends of the springs in the set 62 are shown in Figure 1 as abutting the portions 64 of the saddle members and the opposite ends engage suitable abutments 66 secured to the extremities of the rod 65. In a similar manner, the springs of the set 63 surround a rod 67 which extends through the radially outwardly extending portions 68 of the saddle members and the springs are positioned at opposite sides of the latter portions. As shown in Figure 1, the adjacent ends of the springs of the set 63 abut the radially outer portions of the saddle members and the opposite ends engage abutments 68 which are secured to the extremities of the rod 67. The springs 63 are under compression with a load sufficient to insure centering of the bracket when the brake is released, but the load is not so great as to interfere with further compression of the springs by the applied torque.

With the above construction, it will be noted that the opposed springs of each set cooperate with one another to urge the saddle members toward each other into engagement with opposite sides of the bracket 32 of the adjustment anchor device. Cooperating with the spring influenced saddle members to center the adjustment anchor device is a plate 69 secured to the front side of the backing plate 13 and having an opening 70 therethrough registering with the opening 33 so as not to interfere with shifting movement of the adjustment anchor bracket when the brake is applied.

Upon reference to Figure 2, it will be noted that a pair of lugs 71 and 72 are struck forwardly from the radially inner and outer sides of the opening 70 through the plate 69 and that these lugs extend between the opposite ends of the saddle members. As a result, the opposed springs, previously described, urge the ends of the saddle members into engagement with opposite edges of the lugs on the plate 69 and, since the adjustment anchor bracket 32 is carried by the saddle members, it follows that the latter will be centered in the brake drum. In view of the fact that the adjustment ends of the friction means are maintained into engagement with opposite sides of the wedge 37 and, inasmuch as this wedge is carried by the bracket 32, it also follows that the springs cooperate with the lugs in centering the brake friction means in the brake drum.

The position of the lugs may be varied to accurately center the brake friction means in the brake drum by providing for adjustment of the plate in a direction substantially circumferentially of the brake drum. As shown in Figure 3, a stud 75 is secured to each end of the plate and extends through slots 76 in the backing plate which are elongated in a direction circumferentially of the brake drum. Suitable clamping nuts 77 are threaded upon the rear ends of the studs to effectively clamp the centering plate 69 to the backing plate. It will, of course, be understood that when the plate 69 is adjusted circumferentially relative to the backing plate to accurately center the brake friction means in the drum, the stud 25 at the actuator end of the shoes is permitted to move radially and, in this manner, the brake shoes may be accurately centered within the brake drum.

It will be observed from Figure 1 that the lugs 71 and 72 are so located that the adjustment bracket 32 is also supported in spaced relation to the sides of the registering openings 33 and 70, respectively, formed in the backing plate and adjustment plate. As a consequence, the adjustment anchor bracket is movable in either direction from its center position, and this is desirable in that it provides for obtaining servo, irrespective of the direction of rotation of the brake drum. Assuming that the brake drum is rotated in the direction of the arrow A in Figure 1 and that the brake shoes are applied by the actuator, it will be noted that torque is transferred from the primary shoe 80 to the secondary shoe 81 through the adjustment bracket 32. When this condition exists, the saddle member 58 is moved by the adjustment bracket in the direction of rotation of the brake drum against the action of the springs engaging the saddle member 58. On the other hand, when the drum is rotating in the opposite direction, the saddle member 59 is moved by the adjustment anchor bracket in a direction toward the shoe 80 against the action of the adjacent springs. Thus, it will be observed that a servo action results, irrespective of the direction of rotation of the brake drum and, as a consequence, the braking efficiency is appreciably increased.

The embodiment of the invention illustrated in Figures 5 to 7, inclusive, differs principally from the one previously described in that the centering device 57' is so positioned with respect to the adjustment ends of the brake shoes that the opposed sets of springs 62' and 63' are disposed in alignment with the latter ends of the shoes. With this construction, there will be no tendency for the springs to disalign the parts when the shoes are shifted in one direction or the other against the action of the springs. Upon reference to Figure 6, it will be noted that the adjustment ends of the shoes not only extend through slots 36' in opposite sides of the bracket 32' but, in addition, extend through registering slots 80 formed in the saddles 58' and 59'.

Also, in the embodiment of the invention illustrated in Figures 5 to 7, inclusive, the central portion of the adjustment plate 69' is offset axially inwardly from the backing plate 13' and the opposite edges of the central portion of the plate are provided with the lugs 72'. The lugs 72' extend between the radially inner and outer extremities of the saddles in the same manner as the lugs 72 in the first described form of the invention and are arcuate in cross section to provide a stronger and more durable construction. With the above exceptions, the centering device 57' is the same as the device 57 described in detail in connection with the first embodiment of this invention.

From the foregoing, it will be noted that in both embodiments of the invention, the adjustment device is, in effect, suspended between the ends of the friction means opposite the actuator ends of the latter in such a manner as to not only permit circumferential shifting movement of the adjustment device with the friction means, but to also afford limited radial movement of the adjustment ends of the shoes. Attention may be called to the fact that although the adjustment device is suspended in the brake drum by the opposed springs, nevertheless, the mounting is stable since the width of the portions 69 of the saddle members is such as to provide a substantial bearing area axially of the bracket. The bearing area is sufficient to maintain the axis of the bracket perpendicular to the plane of rotation of the brake drum or, in other words, prevents tilting of the bracket relative to the brake drum. Attention may also be called to the fact at this time that my improved centering device offers the possibility of employing extremely accurate springs for insuring proper centering of the brake friction means over a long period of use.

What I claim as my invention is:

1. In brake mechanism, a brake drum, brake friction means supported within said drum for shifting movement circumferentially of the drum and having spaced ends, means for adjusting the friction means relative to the drum including a member movable axially of the drum between the ends of the friction means and engageable with said ends, and means for suspending said member between the ends of the friction means for shifting movement with the friction means circumferentially of the drum including springs coacting with said member to center the friction means in the drum.

2. In brake mechanism, a brake drum, brake friction means supported within said drum for shifting movement circumferentially of the drum and having spaced ends, means for moving said ends outwardly relative to the drum including a member positioned between said ends and shiftable with the friction means, and yieldable means suspending said member between the ends of the friction means resisting shifting movement of the member and cooperating with the latter to center the friction means in the drum.

3. In brake mechanism, a brake drum, brake friction means supported within said drum for shifting movement in opposite directions circumferentially of the drum and having spaced ends, means for adjusting the brake friction means within the drum including a member movable axially of the drum and engageable with the ends of the friction means, and yieldable means suspending said member between the ends of the friction means affording shifting movement of the member with the friction means in either direction and coacting with the member to center the friction means in the drum.

4. In brake mechanism, a brake drum, a backing plate for the brake drum, brake friction means supported on said backing plate within said drum for shifting movement circumferentially of the drum relative to the backing plate and having spaced ends, means for adjusting the friction means within the drum including a member movable axially of the drum between said ends and engageable with the latter, means supporting said member in the drum for shifting movement in either direction with the friction means including spring means resisting shifting movement of the member circumferentially of the drum and coacting with the member to center the brake friction means in said drum, and means extending through an enlarged opening in the backing plate and engageable with said member for adjusting the latter.

5. In brake mechanism, a brake drum, a backing plate for the drum, brake friction means supported on said backing plate within the drum for shifting movement in opposite directions circumferentially of the drum relative to the backing plate having spaced ends, means for adjusting the friction means relative to the drum including a member movable axially of the drum between the ends of the friction means and shiftable in either direction with said friction means, means normally urging the ends of the friction means toward said member, a stop supported on the backing plate in predetermined relation to the ends of the friction means when the latter is in its released position in the drum, and yieldable means suspending said member between the ends of the friction means and coacting with said stop to center the friction means within the drum.

6. In brake mechanism, a brake drum, a backing plate for the drum, brake friction means supported on said backing plate within the drum for shifting movement in opposite directions circumferentially of the drum relative to the backing plate having spaced ends, means for adjusting the friction means relative to the drum including a member movable axially of the drum between the ends of the friction means and shiftable in either direction with said friction means, means normally urging the ends of the friction means toward said member, a pair of stops mounted on the backing plate at the radially inner and outer sides of the member and predeterminedly positioned with respect to the ends of the friction means in the released position of the latter in the drum, and yieldable means suspending said member between the ends of the friction means and cooperating with said stops and member for centering the friction means in the drum.

7. In brake mechanism, a brake drum, brake friction means supported within the drum for shifting movement in opposite directions circumferentially of the drum and having spaced ends, means for moving the friction means outwardly relative to the drum including a member movable axially of the drum between the ends of the friction means and shiftable circumferentially of the drum with the friction means, means normally urging the ends of the friction means toward said member, a pair of members located on opposite sides of a radial plane passing through the axis of the member and having portions intermediate the radially inner and outer ends forming a support for the member, and yieldable means cooperating with the radially inner and outer ends of the members to urge the latter in directions toward each other.

8. In brake mechanism, a brake drum, brake friction means supported within the drum for shifting movement in opposite directions circumferentially of the drum and having spaced ends, means for moving the friction means outwardly relative to the drum including a member movable axially of the drum between the ends of the friction means and shiftable circumferentially of the drum with the friction means, means normally urging the ends of the friction means toward said member, a pair of members located on opposite sides of a radial plane passing through the axis of the member and having portions intermediate the radially inner and outer ends forming a support for the member, stops located between the radially inner and outer ends of the members to locate the latter in a position wherein the friction means is centered in the drum, and opposed yieldable means at the radially inner and outer ends of said members normally urging the latter ends into engagement with said stops.

9. In brake mechanism, a brake drum, brake friction means supported within the drum for shifting movement in opposite directions circumferentially of the drum and having spaced ends, means for moving the friction means outwardly relative to the drum including a member movable axially of the drum between the ends of the friction means and shiftable circumferentially of the drum with the friction means, means normally urging the ends of the friction means toward said member, a pair of members located on opposite sides of a radial plane passing through the axis of the member and having portions intermediate the radially inner and outer ends forming a support for the member, stops located between the radially inner and outer ends of the members to locate the latter in a position wherein the friction means is centered in the drum, and opposed springs carried by said members at each of the ends aforesaid thereof and acting upon the latter ends to normally maintain the latter into engagement with said stops.

10. In brake mechanism, a brake drum, a backing plate for the drum, brake friction means supported on said backing plate within said drum for shifting movement in opposite directions circumferentially of the drum relative to the backing plate and having spaced ends, a bracket member positioned between the ends of the friction means for shifting movement in either direction circumferentially of the drum with the friction means and having a bore extending axially of the drum, a member slidably mounted in the bore and engageable with the ends of the friction means to move the latter outwardly relative to the drum, a pair of members positioned on opposite sides of a radial plane passing through the axis of the bore and having portions intermediate the radially inner and outer ends cooperating to slidably support the bracket member, and opposed springs carried by the cooperating members at each of the aforesaid ends thereof and effective to maintain said members into frictional engagement with the bracket member.

11. In brake mechanism, a brake drum, a backing plate for the drum, brake friction means supported on said backing plate within the drum for shifting movement in opposite directions circumferentially of the drum relative to the backing plate and having spaced ends, a bracket member extending through an enlarged opening in the backing plate between the ends of the friction means and shiftable with the friction means circumferentially of the drum, said bracket member having a bore extending axially of the brake drum, an adjustable element slidably mounted in the bore and engageable with the ends of the friction means to move the latter outwardly relative to the drum, a pair of members positioned on opposite sides of a radial plane passing through the axis of the bore in the bracket member and having portions intermediate the radially inner and outer ends thereof cooperating with each other to form a support for the bracket member, a pair of stops mounted on the backing plate in predetermined relation to the ends of the friction means in the released position of the latter in the drum and located between the radially inner and outer ends of said members, and opposed springs carried by the members at each of said ends and normally urging the latter into engagement with said stops.

12. In brake mechanism, a brake drum, a backing plate for the drum, brake friction means supported on said backing plate within the drum for shifting movement in opposite directions circumferentially of the drum relative to the backing plate and having spaced ends, a bracket member extending through an enlarged opening in the backing plate between the ends of the friction means and shiftable with the friction means circumferentially of the drum, said bracket member having a bore extending axially of the brake drum, an adjustable element slidably mounted in the bore and engageable with the ends of the friction means to move the latter outwardly relative to the drum, a pair of members positioned on opposite sides of a radial plane passing through the axis of the bore in the bracket member and having portions intermediate the radially inner and outer ends thereof cooperating with each other to form a support for the bracket member, a pair of stops mounted on the backing plate in predetermined relation to the ends of the friction means in the released position of the latter in the drum and located between the radially inner and outer ends of said members, opposed springs carried by the members at each of said ends and normally urging the latter into engagement with said stops, and means for adjusting the position of the stops to provide for accurately centering the friction means in the drum.

13. In brake mechanism, a brake drum, brake friction means supported within said drum for shifting movement in opposite directions circumferentially of the drum and having spaced ends, a member supported between said ends for shifting movement in opposite directions with the friction means and operable to move the friction means outwardly relative to the brake drum, and means for resisting shifting movement of the member in either direction from its center position between the ends of the friction means including opposed springs located at the radially inner and outer sides of the member in a manner that the lines of action of the springs lie in a common plane with the ends aforesaid of the friction means.

14. In brake mechanism, a brake drum, brake friction means supported within said drum for shifting movement in opposite directions circumferentially of the drum and having spaced ends, a member supported between said ends for shifting movement in opposite directions with the friction means and for movement axially of the drum relative to the friction means to move the latter outwardly into engagement with the drum, means acting on the member for resisting shifting movement of the member in either direction from its center position between the ends of the friction means including two pairs of opposed springs respectively located at the radially inner and outer sides of the member with the lines of action of the springs in a common plane with the end portions aforesaid of the brake friction means.

15. In brake mechanism, a brake drum, brake friction means supported within the drum for shifting movement in opposite directions circumferentially of the drum and having spaced ends, means for adjusting the brake friction means within the drum including a member movable axially of the drum between the ends of the friction means, and means supporting the member between the ends of the friction means affording shifting movement of the member with the friction means in either direction and coacting with the member to center the friction means in the drum, said last named means comprising pairs of opposed coil springs respectively located at the radially inner and outer sides of the member with the axes of the springs located in a common plane with the ends of the friction means.

16. In brake mechanism, a brake drum, brake friction means supported within the drum for shifting movement in opposite directions circumferentially of the drum and having spaced ends, means for moving the friction means outwardly relative to the drum including an element movable axially of the drum between the ends of the friction means and shiftable circumferentially of the drum with the friction means, a bracket shiftable with the element and forming a support for the latter to guide the same axially of the drum, a pair of members located on opposite sides of a radial plane passing through the axis of the element and having portions intermediate the radially inner and outer ends engageable with opposite sides of the bracket to form a support for the latter, and means resisting shifting movement of the bracket and element in either direction from its center position between the ends of the friction means including opposed springs acting on opposite ends of the pair of members in a manner to urge the members into frictional engagement with the bracket and having the lines of force thereof lying in a common plane with the ends of the friction means.

17. In brake mechanism, a brake drum, brake friction means supported within the drum for shifting movement in opposite directions circumferentially of the drum and having spaced ends, means for moving the friction means outwardly relative to the drum including an element movable axially of the drum between the ends of the friction means and shiftable circumferentially of the drum with the friction means, a bracket shiftable with the element and forming a support for the latter to guide the same axially of the drum, a pair of members located on opposite sides of a radial plane passing through the axis of the element and having portions intermediate the radially inner and outer ends engageable with opposite sides of the bracket to form a support for the latter, means resisting shifting movement of the bracket and element in either direction from its center position between the ends of the friction means including opposed springs acting on opposite ends of the pair of members in a manner to urge the members into frictional engagement with the bracket and having the lines of force thereof lying in a common plane with the ends of the friction means, and stops fixed against movement with the friction means and positioned between the opposite ends of the members.

JAMES E. CORNWALL.